Patented Aug. 2, 1938

2,125,384

UNITED STATES PATENT OFFICE 2,125,384

PREPARATION OF ETHYNYL CARBINOLS

Alexander Douglas Macallum, Niagara Falls, N. Y., assignor to E. I. du Pont de Nemours & Company, Wilmington, Del., a corporation of Delaware No Drawing. Application July 20, 1936,
Serial No. 91,619

16 Claims. (Cl. 260—156)

This invention relates to the reaction of aliphatic or aromatic carbonyl compounds or alkylene oxides with organo-metallic compounds and more particularly to the reaction of aliphatic or aromatic aldehydes, ketones or alkylene oxides with alkali metal acetylides and their homologues.

Heretofore certain aldehydes and ketones have been reacted with alkali metal acetylides or their homologues, i. e., the alkali metal compounds of alkyl acetylides, using liquid ammonia as solvent medium. The immediate products of such reactions are the sodium derivatives of acetylenic alcohols. For example, acetone thus reacted with sodium acetylide gives the sodium compound of dimethyl ethynyl carbinol. By hydrolysis, the alkali metal may be replaced with hydrogen to produce the pure carbinol, which then can be recovered from the reaction mixture. Heretofore, in carrying out this reaction the practice has been first to prepare a suspension of sodium acetylide in liquid ammonia and then add the aldehyde or ketone thereto in theoretical quantity or in excess and allow the reaction mixture to stand to complete the reaction. The practice then has been to evaporate off the ammonia and treat the residue with a weak acid solution to convert the sodium alcoholate to the free carbinol. The desired product then may be separated from the reaction residue by distillation or by extraction with a suitable solvent; usually steam distillation has been employed.

An object of the present invention is to devise an improved method for reacting organic carbonyl compounds or alkylene oxides with alkali metal acetylides and their homologues to produce acetylenic alcohols, whereby improved yields result. Other objects will be apparent from the following description of my invention.

I have found that the amount of carbonyl compound or alkylene oxide converted to acetylenic alcohol in the above mentioned reactions can be greatly increased if care is taken to keep the mixtures in solution in the liquid ammonia for a prolonged period of at least about 5 hours, e. g., 5 to 50 hours, while maintaining the temperature at or below $-33°$ C. I have further discovered that the yield may still further be improved and the isolation of the reaction products simplified by avoiding the addition of water or acids to the products of reaction. This may be done in accordance with the present invention by adding to the liquid ammonia after the reaction between the carbonyl compounds or alkylene oxides and the acetylide has been substantially completed, a sufficient amount of a dry ammonium salt to react with the alkali metal alcoholate to produce the alcohol, sodium salt and ammonia. By thus utilizing the liquid ammonia as a solvent for the conversion of the alcoholate to the free alcohol, I avoid undesirable side reactions which occur following other procedures as for example, where the alkaline mixtures are heated to expel the residual ammonia prior to neutralization and isolation of the products. This method of neutralizing the products also enables a substantially quantitative recovery of the ammonia used and without its contamination with appreciable moisture.

In one method of practicing my invention I first prepare a suspension of the alkali metal acetylide, e. g. sodium acetylide, in liquid ammonia which is maintained preferably at temperatures of $-50$ to $-35°$ C. Such a suspension may be prepared by any known means; I prefer to prepare it by first dissolving sodium in the liquid ammonia and then passing acetylene through the sodium solution whereby the sodium acetylide is formed. In this method of preparing sodium acetylide the sodium first reacts with the ammonia to form sodamide and the latter reacts with the acetylene. In carrying out this preparation it is preferable to prepare the sodamide by reacting sodium with ammonia in the presence of small amounts of sodium oxide and a salt of iron, cobalt or nickel, in the manner described by Vaughn, Vogt and Nieuwland, (J. Am. Chem. Soc., vol. 56, pages 2120 to 2122 (1934)).

While maintaining the temperature of the sodium acetylide suspension in liquid ammonia at $-50$ to $-35°$ C., I slowly add thereto the aldehyde, ketone or alkylene oxide to be reacted. The addition of the carbonyl compound or alkylene oxide is best maintained at a rate slow enough to prevent the reaction mixture from boiling. It is preferable to agitate the reaction mixture continuously during the addition of the carbonyl compound or alkylene oxide and to continue the agitation during the reaction period. I maintain the reaction mixture at a temperature not higher than $-33°$ C. for a period of from 5 to 50 hours, depending on the nature of the organic materials used. When the reaction has reached substantial completion, I add thereto a suitable ammonium salt such as ammonium chloride in an amount chemically equivalent to the amount of sodium present in the reaction mixture or in excess thereof. The ammonium salt reacts with the sodium alcoholate in the liquid ammonia according to the following equation:

$$NH_4Cl + RONa \rightarrow ROH + NaCl + NH_3$$

The reaction mixture then is heated, for example to +20° to +40° C., to completely evaporate the ammonia. The residue remaining after the evaporation is treated in any desirable manner to recover therefrom the carbinol compound formed by the above reaction. Thus the carbinol may be recovered from the evaporation residue by distillation under reduced pressure or it may be extracted by means of an organic solvent. Various organic solvents including alkyl or alkylene halides or other halogenated hydrocarbons may be employed for the extraction of the carbinols from the reaction residues. I prefer to use methylene chloride for this purpose on account of its generally good solvent power for the carbinols, its comparative lack of solvent power for inorganic salts, its relatively low boiling point, its comparative stability and its incombustibility.

The following examples serve to illustrate my invention:

EXAMPLE I

Apparatus

The reaction vessel comprises a 3-necked, 5-liter flask set up in a 10 or 12 inch cylindrical "Pyrex" or earthenware pot (serving as methanol and "dry-ice" cooling bath), and flask equipped with a flag-shaped steel stirrer with mercury seal, an inlet for ammonia, acetylene or calcium chloride-dried air, a combined inlet and bypass for pure, anhydrous nitrogen. The reaction flask is also fitted with a thermometer and an off-gas bubbler containing ice machine oil. The solid materials for the charge are introduced by removing the stopper from one of the necks of the flask, the liquid (acetone) being added by means of a dropping funnel temporarily attached in place of the acetylene inlet tube.

Preparation of sodamide catalyst

About 3300 cc. of liquid ammonia is condensed out in the reaction flask (by cooling the bath to −60° C.); then a 1.2 g. amount of finely powdered, hydrated ferric nitrate $$(Fe_2(NO_3)_3 . 9H_2O)$$

is added and the mixture stirred a few minutes to dissolve the latter, followed by addition of about 4 g. of sodium metal. The mixture is again stirred several minutes to effect solution of the metal, after which dried air is introduced until the blue color of the mixture turns to brown or black. At this point, the air is shut off and replaced by a slow stream of purified anhydrous nitrogen, the bath temperature being raised by addition of methanol until the inside temperature reaches −35°.

Preparation of sodamide 138 g. (6 atoms) of sodium, cut in cubes of about half inch size, are now introduced piecemeal into the mixture and stirring continued until the mixture goes over from a blue color to grey, indicating conversion of sodammonium to sodamide, a reaction requiring 20–50 minutes to complete.

Preparation of sodium acetylide

While keeping the temperature at about −35° pass in acetylene (purified by scrubbing in succession with water, 10% sulphuric acid, 10% sodium hydroxide solution and dried by passage over calcium chloride then phosphorus pentoxide or by passing through a cooler at about −70°) at a rate of 2 liters a minute until the mixture again turns black, which point has been found by measurement to correspond to the completion of formation of sodium acetylide. Alternately the calculated amount of acetylene (134.6 liters at standard temperature and pressure) or an excess thereof, may be measured into the reaction mixture.

Reaction with acetone

The acetylene supplied is then cut down to not more than 50–100 cc. per minute and 439 cc. (6 molecules) of acetone (previously dried with anhydrous magnesium sulphate) are added at such a rate that the temperature does not exceed −35°. The stirring is continued at this temperature for about 6 hours. At this point the condensation reaction is brought to a close by gradual addition of 353 g. (6.6 molecules) of dry, powdered ammonium chloride, considerable heat being evolved in the process. The mixture is stirred for half an hour more to complete the neutralization of the sodium alkyl carbinol by the ammonium chloride and then is let stand over night at room temperature to allow most of the ammonia to evaporate.

Separation of dimethyl ethynyl carbinol

Next morning the reaction residue is brought to a temperature of +40° by replacing the methanol bath with warm water. The temperature is kept at this level until ammonia ceases to come through the oil bubbler.

The mixture is again cooled to room temperature, diluted with 500 cc. of methylene chloride, filtered as far as possible by cautious partial suction (so as to avoid evaporation losses) and the flask and filter residue extracted successively about 5 times with 100 cc. amounts of methylene chloride.

The combined filtrates, after drying over night with anhydrous potassium carbonate, then are ready for separation of the carbinol, which is effected by fractional distillation at ordinary pressure. The 5° fractions boiling from 85° to 110° are isolated separately. The main (95–105°) fraction of dimethyl ethynyl carbinol amounts to as much as 500 g. (99% of the theoretical) about 96% boiling at 100–105°.

EXAMPLE II

Methyl ethynyl carbinol $(CH_3CHOHC\equiv CH)$

Sodium acetylide (288 g.), prepared as in Example I, in liquid ammonia (3 liters) is treated with freshly vaporized acetaldehyde (254 g.) and the mixture stirred for 24 hours at −40° to −35° C., subsequently being worked up by neutralization with dry ammonium chloride powder (360 g.), evaporation of the ammonia and extraction with methylene chloride as in Example I. The extract, on drying with anhydrous potassium carbonate yields 342 g. of methyl ethynyl carbinol (thus an 84.4% recovery on the acetaldehyde used) in form of a liquid fraction boiling at 100–110° C.

EXAMPLE III

Propargyl carbinol $(CH\equiv CCH_2CH_2OH)$

Sodium acetylide (96 g.) in liquid ammonia (2200 cc.) is treated with ethylene oxide (97 g.) and the mixture stirred under a stationary atmosphere of oxygen-free nitrogen for a 13 hour period at −40° to −35° C. The mixture is then neutralized while stirring by a cautious addition of dry ammonium chloride (120 g.), the ammonia evaporated away and the semisolid product extracted with methylene chloride after the procedure cited in Example I. There is obtained a 54% yield of propargyl carbinol in the form of a fraction boiling at 125–130° C. The product can be identified by conversion to 1,1,2-triiodobuten-1-ol (4) after the method of Lespieau and Pariselle (Compt. rend. 146, 1037 (1908)).

EXAMPLE IV

*Ethynyl furfuralcohol ($C_4H_3O.CHOHC{\equiv}CH$)*

Following a similar procedure, sodium acetylide (96 g.) in liquid ammonia (3 liters) is treated with freshly distilled furfural (192 g.) of boiling range 157–158° C. uncorr. and stirred for 10 hours at −40° C. The product, worked up by neutralization with ammonium chloride (120 g.), evaporation and methylene chloride extraction gives a 30% recovery in the form of a fraction boiling at 100–103° C. at 25 mm. pressure or 199.5–201.5° C. corr. at 749.3 mm. and having a refraction of 1.504 for the D line at 20°. The product is evidently a not quite pure ethinyl furfuralcohol. On combustion it analyzes 67.7% C, 5.?% H (as against 65.5% C and 5.4% H calculated for $C_7H_6O_2$).

EXAMPLE V

*Ethynyl borneol ($C_{10}H_{16}(OH)C{\equiv}CH$)*

Sodium acetylide (96 g.) in liquid ammonia (3 liters) is treated with a solution of natural (dextro) camphor (304 g.) in ethyl ether (350 cc.), stirred for 10 hours at −40° to −35° C., the reaction mixture being neutralized and worked up as in the preceding example. The product, occurring as a solid residue on evaporating the methylene chloride and heating to 125° C. at 25 mm. pressure, comprises a mixture containing an appreciable amount of unchanged camphor, which can be eliminated by converting to its semicarbazone and steam distilling off the indifferent material. The latter melts at 56–60° and gives positive tests for the acetylene bond with cuprous oxide ammonia and with alcoholic silver nitrate solutions. The product, recovered in about 15% yields is evidently an ethinyl borneol. Found (by analysis): 80.1% C and 11.1% H (as against 80.8% C and 10.1% H calculated for $C_{12}H_{18}O$).

EXAMPLE VI

*Ethinyl benzyl alcohol ($C_6H_5CHOHC{\equiv}CH$)*

Sodium acetylide (96 g.) in liquid ammonia (3 liters) is treated with freshly distilled benzaldehyde (212 g.) in ethyl ether (450 cc.) and stirred for 14 hours at −40° to −35° C. before neutralizing with ammonium chloride (120 g.) and working up as in previous examples. The methylene chloride extract, on distilling, yields 21% of an ethinyl benzyl alcohol fraction boiling at 114–119° C. at a pressure of 18 mm. and having properties substantially the same as the corresponding material obtained from acetylene magnesium bromide and benzaldehyde (Lespieau; Bull. S. Chem. 39, 991 (1926)). The main reaction product, however, is a resin.

EXAMPLE VII

*Phenyl methyl ethynyl carbinol ($C_6H_5C(CH_3)(OH)C{\equiv}CH$)*

Sodium acetylide (96 g.) in liquid ammonia (2600 cc.) is treated with acetophenone (217 g.) and stirred for 12½ hours at −40° to −35° C., the mixture then neutralized with ammonium chloride (120 g.) and worked up as in previous examples. The product fraction, 105–107° C. at 15 mm., which is obtained in 50% yield comprises mainly solid phenyl methyl ethynyl carbinol together with some liquid having a refraction of 1.536 for the D line at 20°. The solid carbinol melts at 49–50° like that obtained by Rupe and Giesler (Helv. Chem. Acta 11, 656 (1928)) in 10% yield by reaction of acetophenone with sodamide in ether saturated with acetylene.

EXAMPLE VIII

*Ethyl ethynyl carbinol ($C_2H_5CHOHC{\equiv}CH$)*

Sodium acetylide (432 g.) in liquid ammonia (3500 cc.) is treated with freshly distilled propionaldehyde (523 g.) and the mixture stirred for 12 hours at −40° to −35° C. After neutralizing with dry ammonium chloride (540 g.) and working up as in previous examples there is obtained a 54% yield of ethyl ethynyl carbinol boiling at 120–122° C. uncorr. (as against 125° C. corr. at 761 mm. quoted by Lespieau (Compt. rend. 152, 879 (1911) for the product obtained by dehydrohalogenation of ethyl dibromethyl carbinol).

In the above examples I have indicated the results to be obtained by the reaction of approximately molecular amounts of carbonyl compounds and alkylene oxides with sodium acetylide in liquid ammonia under the preferred conditions. In these cases the acetylide may be considered to act entirely as a chemical condensing agent, being itself used up in the reaction. It is possible, however, to carry out the reaction in a partly catalytic manner where an amount of sodium acetylide is allowed to react with an excess of both acetylene and acetone in liquid ammonia. In this way I have been able to obtain yields of dimethyl ethynyl carbinol as high as 175% on basis of the sodium used. To obtain this effect, however, it is necessary to carry the reaction out over a more prolonged interval (e. g. 24 hours at −50°) the catalytic condensation being relatively slower than that carried out in the preferred manner described above.

In carrying out my invention, the reaction between the acetylide and the carbonyl compound may be carried out at a superatmospheric pressure if desired. This, however, is not generally advantageous, since in most cases the reaction can be effected quite satisfactorily at a temperature below that of the normal boiling point of liquid ammonia and therefore an increased pressure is not necessary to maintain the ammonia in the liquid state. While I prefer to conduct the reaction at a temperature of from −50 to −35° C., lower temperatures than this may be used with substantially equivalent results although the rates of reaction naturally are decreased at the lower temperatures.

While generally I prefer to effect the reactions cited by treatment of preformed alkali acetylide in liquid ammonia with the alkyl carbonyl compounds or alkylene oxides, alternative methods of carrying out this type of reaction may be employed. For example, the alkali metal amide in liquid ammonia first may be treated with the alkyl carbonyl compound (thereby forming an alkali derivative) or with the alkylene oxide, the mixture then being treated with acetylene or an alkyl acetylene in a subsequent step. Or again, the alkali amide, in liquid ammonia, may be treated simultaneously with the acetylene hydrocarbon and the alkyl carbonyl compound or the alkylene oxide.

Where the carbonyl compound or the alkylene oxide used is not appreciably soluble in liquid ammonia by itself it may be rendered more miscible by dissolving it in ethyl ether or another indifferent solvent before adding it to the liquid ammonia mixture. If higher temperatures are employed, more particularly where the temperature during the condensation of the acetylide with the carbonyl compound is allowed to exceed +30°, in general the resulting yield of product will be less owing to the occurrence of side reactions not observed at the lower temperatures. My invention is not restricted to the reaction of an alkali metal derivative of acetylene itself but also may be utilized in effecting reactions of alkali metal compounds of acetylenic hydrocarbons other than acetylene, for example, methyl acetylene and other alkyl acetylenes.

Likewise, this invention is not restricted to the specific carbonyl compounds or alkylene oxides in the examples but other aldehydes, ketones or alkylene oxides also may be used although not all with equally satisfactory results, since certain of these, owing to a tendency toward condensation or polymerization by themselves, may yield more or less resin or other by-product.

I claim:

1. The process comprising reacting sodium acetylide with an alkylene oxide in the presence of liquid ammonia, while maintaining the reaction mixture at a temperature not above about −33° C., for a period of at least 5 hours and thereafter evaporating the reaction mixture to remove ammonia therefrom and recovering the resulting carbinol from the residue.

2. The process comprising reacting an alkali metal compound of an acetylenic hydrocarbon with an organic compound selected from the group consisting of aliphatic and aromatic aldehydes and ketones and alkylene oxides in the presence of liquid ammonia, subsequently adding to said reaction mixture an ammonium salt and thereafter evaporating the reaction mixture to remove ammonia therefrom and recovering the resulting carbinol from the residue.

3. The process comprising reacting an alkali metal compound of an acetylenic hydrocarbon with an alkylene oxide in the presence of liquid ammonia, subsequently adding to said reaction mixture an ammonium salt and thereafter evaporating the reaction mixture to remove ammonia therefrom and recovering the resulting carbinol from the residue.

4. The process comprising reacting an alkali metal acetylide with an organic compound selected from the group consisting of aliphatic and aromatic aldehydes and ketones and alkylene oxides in the presence of liquid ammonia, subsequently adding to said reaction mixture an ammonium halide and thereafter evaporating the reaction mixture to remove ammonia therefrom and recovering the resulting carbinol from the residue.

5. The process comprising reacting sodium acetylide with acetone in the presence of liquid ammonia, subsequently adding to said reaction mixture ammonium chloride and thereafter evaporating the reaction mixture to remove ammonia therefrom and recovering the resulting carbinol from the residue.

6. The process comprising reacting sodium acetylide with acetaldehyde in the presence of liquid ammonia, subsequently adding to said reaction mixture ammonium chloride and thereafter evaporating the reaction mixture to remove ammonia therefrom and recovering the resulting carbinol from the residue.

7. The process comprising reacting an alkali metal compound of an acetylenic hydrocarbon with an alkylene oxide in the presence of liquid ammonia, while maintaining the reaction mixture at a temperature not above −33° C., subsequently adding to said reaction mixture an ammonium salt and thereafter evaporating the reaction mixture to remove ammonia therefrom and recovering the resulting carbinol from the residue.

8. The process comprising reacting an alkali metal acetylide with a ketone in the presence of liquid ammonia, while maintaining the reaction mixture at a temperature not above −33° C., for a period of at least 5 hours, subsequently adding to said reaction mixture ammonium chloride and thereafter evaporating the reaction mixture to remove ammonia therefrom and recovering the resulting carbinol from the residue by extraction with a non-aqueous solvent.

9. The process comprising reacting an alkali metal acetylide with an aldehyde containing in the presence of liquid ammonia, while maintaining the reaction mixture at a temperature not above about −33° C., subsequently adding to said mixture ammonium chloride and thereafter evaporating the reaction mixture to remove ammonia therefrom and recovering the resulting carbinol from the residue by extraction with a non-aqueous solvent.

10. The process comprising reacting an alkali metal acetylide with an alkylene oxide in the presence of liquid ammonia, while maintaining the reaction mixture at a temperature not above about −33° C., subsequently adding to said reaction mixture ammonium chloride and thereafter evaporating the reaction mixture to remove ammonia therefrom and recovering the resulting carbinol from the residue by extraction with a non-aqueous solvent.

11. The process comprising reacting sodium acetylide with acetone in the presence of liquid ammonia, while maintaining the reaction mixture at a temperature −50 to −35° C., subsequently adding to said reaction mixture ammonium chloride and thereafter evaporating the reaction mixture to remove ammonia therefrom and recovering the resulting carbinol from the residue by extraction with methylene chloride.

12. The process comprising reacting sodium acetylide with acetaldehyde in the presence of liquid ammonia, while maintaining the reaction mixture at a temperature −50 to −35° C., subsequently adding to said reaction mixture ammonium chloride and thereafter evaporating the reaction mixture to remove ammonia therefrom and recovering the resulting carbinol from the residue by extraction with methylene chloride.

13. The method for converting an alkali metal alcoholate to the corresponding free alcohol in liquid ammonia which comprises reacting said alcoholate in said liquid ammonia with an ammonium salt.

14. The method for converting an ankali metal alcoholate to the corresponding free alcohol in liquid ammonia which comprises reacting said alcoholate in said liquid ammonia with ammonium chloride.

15. In a process for reacting an alkali metal compound of an acetylenic hydrocarbon with an organic compound selected from the group consisting of aliphatic and aromatic aldehydes and ketones and alkylene oxides in liquid ammonia to form an alkali metal alcoholate, the step comprising reacting said alcoholate in liquid ammonia with an ammonium salt.

16. In a process for reacting an alkali metal acetylide with an organic compound selected from the group consisting of aliphatic and aromatic aldehydes and ketones and alkylene oxides in liquid ammonia to form an alkali metal alcoholate, the step comprising reacting said alcoholate in liquid ammonia with ammonium chloride.

ALEXANDER DOUGLAS MACALLUM.